US011227017B2

(12) United States Patent
Schaer et al.

(10) Patent No.: US 11,227,017 B2
(45) Date of Patent: Jan. 18, 2022

(54) PROVIDING SUGGESTIONS FOR INTERACTION WITH AN AUTOMATED ASSISTANT IN A MULTI-USER MESSAGE EXCHANGE THREAD

(71) Applicant: Google Inc., Mountain View, CA (US)

(72) Inventors: Michael Schaer, Pfäffikon (CH); Alexandru Tudor, Uitikon (CH); Ori Gershony, Redmond, WA (US); Fredrik Bergenlid, Zürich (CH); Behshad Behzadi, Freienbach (CH); Tomislav Grbin, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 307 days.

(21) Appl. No.: 15/157,115

(22) Filed: May 17, 2016

(65) Prior Publication Data
US 2017/0337209 A1 Nov. 23, 2017

(51) Int. Cl.
G06F 16/9032 (2019.01)
G06F 16/25 (2019.01)
(Continued)

(52) U.S. Cl.
CPC ...... *G06F 16/90324* (2019.01); *G06F 3/0482* (2013.01); *G06F 3/04842* (2013.01);
(Continued)

(58) Field of Classification Search
CPC ............... G06F 17/3097; G06F 3/0482; G06F 3/04842; G06F 17/3056; G06F 16/90324;
(Continued)

(56) References Cited

U.S. PATENT DOCUMENTS

2006/0167992 A1 7/2006 Cheung et al.
2009/0254840 A1 10/2009 Churchill et al.
(Continued)

FOREIGN PATENT DOCUMENTS

CN 101611398 12/2009
CN 103377276 10/2013
(Continued)

OTHER PUBLICATIONS

International Search Report and Written Opinion of PCT Ser. No. PCT/US16/68354 dated May 4, 2017.
(Continued)

*Primary Examiner* — Matthew Ell
*Assistant Examiner* — Lahcen Ennaji
(74) *Attorney, Agent, or Firm* — Middleton Reutlinger

(57) ABSTRACT

Providing at least one contextually relevant suggestion to one or more users of an ongoing message exchange thread between the users. The suggestion is provided for presentation to the user(s) via user interface output device(s) of computing device(s) of the user(s). The suggestion indicates a query that can be submitted to an automated assistant to cause the automated assistant to incorporate, into the message exchange thread, content that is responsive to the query. In some implementations, the suggestion is a selectable suggestion and content that is responsive to the query is incorporated into the message exchange thread in response to user interface input that is directed to the selectable suggestion. In some implementations, the suggestion is determined based on one or more messages that have already been communicated between users of the message exchange thread.

19 Claims, 8 Drawing Sheets

(51) Int. Cl.
*G06F 16/9535* (2019.01)
*G06F 3/0482* (2013.01)
*G06F 3/0484* (2013.01)
*H04L 12/58* (2006.01)

(52) U.S. Cl.
CPC ........ *G06F 16/252* (2019.01); *G06F 16/9535* (2019.01); *H04L 51/046* (2013.01); *H04L 51/16* (2013.01)

(58) Field of Classification Search
CPC . G06F 16/9535; G06F 16/252; H04L 41/046; H04L 51/16; H04L 51/046
See application file for complete search history.

(56) References Cited

U.S. PATENT DOCUMENTS

| | | |
|---|---|---|
| 2012/0284093 A1 | 11/2012 | Evans |
| 2013/0297317 A1 | 11/2013 | Lee et al. |
| 2014/0173460 A1 | 6/2014 | Kim |
| 2014/0195621 A1 | 7/2014 | Rao |
| 2015/0350118 A1* | 12/2015 | Yang .............. H04L 51/02 715/752 |
| 2016/0036751 A1* | 2/2016 | Ban .............. H04L 51/18 455/414.1 |
| 2016/0055246 A1 | 2/2016 | Marcin et al. |
| 2016/0171538 A1* | 6/2016 | Balasubramanian ............. G06F 16/24565 705/14.53 |
| 2016/0197869 A1* | 7/2016 | Kim .............. H04L 51/18 715/753 |
| 2016/0301639 A1* | 10/2016 | Liu .............. G06Q 50/01 |
| 2017/0295122 A1* | 10/2017 | Pfriem .............. H04L 51/04 |
| 2019/0297047 A1* | 9/2019 | Pavitt .............. H04L 51/046 |

FOREIGN PATENT DOCUMENTS

| | | |
|---|---|---|
| CN | 104216942 | 12/2014 |
| CN | 104794122 | 7/2015 |
| JP | 2004227313 A | 8/2004 |
| JP | 2010519609 A | 6/2010 |
| JP | 2015028798 A | 2/2015 |
| JP | 2016051186 A | 4/2016 |

OTHER PUBLICATIONS

The Intellectual Property Office of the United Kingdom; Combined Search under Section 17(5)(b) and Abbreviated Examination Report under Section 18(3) of Application No. GB1621668.1 dated Mar. 14, 2017.
European Patent Office; International Preliminary Report on Patentability of International Application No. PCT/US2016/068354; 17 pages; dated Apr. 16, 2018.
The Korean Intellectual Property Office; Notice of Allowance issued for Application No. 10-2018-7035967 dated May 8, 2019.
European Patent Office; Decision to Grant EP Application No. 16828844.7; 54 pages; dated Oct. 25, 2018.
The Korean Intellectual Property Office; Office Action issued for Application No. 10-2018-7035967 dated Jan. 22, 2019.
Japanese Patent Office; Office Action issued in Application No. 2018-560476 dated Jun. 17, 2019.
Japanese Patent Office; Decision of Rejection issued in Application No. 2018-560476 dated Oct. 15, 2019.
China National Intellectual Property Administration; Notification of First Office Action issue in Application No. 201611236617.9; dated Mar. 11, 2020.
Intellectual Property India; Examination Report issue in Application No. 201847003974; 6 pages; dated Sep. 10, 2020.
China National Intellectual Property Administration; Notification of Second Office Action issue in Application No. 201611236617.9; 18 pages; dated Aug. 31, 2020.
Japanese Patent Office; Office Action issued in Application No. 2018-560476; 6 pages; dated Apr. 19, 2021.
China National Intellectual Property Administration; Notice of Allowance issue in Application No. 201611236617.9; 4 pages; dated Dec. 4, 2020.
Japanese Patent Office; Notice of Allowance issued in Application No. 2018-560476; 23 pages; dated Sep. 6, 2021.

* cited by examiner

PROVIDING SUGGESTIONS FOR INTERACTION WITH AN AUTOMATED ASSISTANT IN A MULTI-USER MESSAGE EXCHANGE THREAD

BACKGROUND

Multiple users may communicate with each other textually via message exchange threads that may be implemented using various technologies, such as text message exchanges, online chat (e.g., instant messenger, Internet relay chat), social network messaging threads, and so forth. Client message exchange apps such as text messaging apps, online chat apps, social networking apps, etc., may display at least part of a transcript (e.g., a live or near live record of text and/or images that is updated in real time as the users converse) of an ongoing message exchange thread as part of a graphical user interface, so that users can follow the conversation.

The ongoing message exchange thread, and hence, the displayed transcript, is typically limited to text or other data such as pictures that users deliberately and explicitly incorporate into the message exchange thread. Consequently, users seeking outside information pertinent to the conversation must switch to a different application such as a web browser to obtain the desired information. Switching applications may have one or more drawbacks in various scenarios, such as when using mobile computing devices that often only display a single application at a time. For example, switching applications can be distracting and burdensome, may disrupt the flow of the conversation, and/or may tax one or more computational resources (e.g., memory, processor, and/or battery resources of a mobile computing device). Additional and/or alternative drawbacks of client message exchange apps may be presented.

SUMMARY

Some implementations of this specification are directed to providing at least one contextually relevant suggestion to one or more users of an ongoing message exchange thread between the users. The suggestion is provided for presentation to the user(s) via user interface output device(s) of computing device(s) of the user(s). The suggestion indicates a query that can be submitted to an automated assistant (e.g., submitted to the automated assistant via the message exchange thread) to cause the automated assistant to incorporate, into the message exchange thread, content that is responsive to the query.

In some implementations, the suggestion is a selectable suggestion (e.g., a selectable graphical element provided for display) and content that is responsive to the query is incorporated into the message exchange thread in response to user interface input (e.g., a "tap", a "click", a "verbal command") that is directed to the selectable suggestion. In some implementations, the suggestion is determined based on one or more messages that have already been communicated between users of the message exchange thread. For example, the query indicated by the suggestion may be determined based on one or more terms, images, and/or other content of the already communicated messages.

As one specific example of some implementations described herein, assume "Tom", "Jerry", and "Spike" are engaged in a message exchange thread. Further assume that "Tom" uses a message exchange client of one of his computing devices to formulate a message of "I heard B and A has a concert in Louisville, any interest?" and to incorporate that message into the thread. Further assume Jerry uses a text messaging application of his computing device to formulate a reply message of "Any idea what date?" and to incorporate that message into the thread. A query of "date of B and A Louisville concert" may be determined based on the message and based on the reply message according to one or more techniques described herein. Further, a suggestion that is a selectable graphical element that provides an indication of the query (e.g., that includes all the terms of the query) may be provided for display to Tom, Jerry, and/or Spike via their respective text messaging applications. In response to user interface input from one of the users that is directed to the selectable graphical element displayed to the user, content that is responsive to the query may be automatically incorporated into the message exchange thread and displayed to one or more (e.g., all) of the users. For example, the content may include text that indicates the date, time, and/or the location of B and A's concert in Louisville. The content may be determined, for example, based on one or more search results returned for a search issued for the query.

In some implementations, providing contextually relevant suggestions during an ongoing message exchange thread may facilitate submission, by users, of queries that are indicated by those suggestions and whose submission causes an automated assistant to incorporate contextually relevant content into the message exchange thread. This may reduce and/or eliminate the need for a user to switch from an application rendering the message exchange thread to another application in order to satisfy certain informational needs of the user.

This may further reduce the use of certain computational resources that would otherwise be consumed in switching to another application to satisfy the informational needs. For example, switching to another application may require usage of processor, memory, and/or battery resources via launching and/or surfacing of the application. Further, switching to another application to obtain content in lieu of obtaining the content from an automated assistant in a message exchange thread may increase the amount of time the user needs to spend obtaining the information—which may lead to a corresponding increase in consumption of computational resources in obtaining the content. In some implementations, techniques described herein further serve to educate users about various types of input that may be provided by the user to an automated assistant in future ongoing message exchange scenarios, such as scenarios where suggestions aren't provided and/or provided suggestions don't meet the user's informational needs.

In some implementations, a method performed by one or more processors is provided that includes determining at least one candidate query based on one or more already communicated messages of an ongoing message exchange thread. The ongoing message exchange thread is between at least a first user and a second user via a first message exchange client of the first user and a second message exchange client of the second user. The method further includes providing, for display to at least the first user via the first message exchange client, a selectable graphical element that provides an indication of the candidate query. The method further includes, in response to user interface input of the first user that is directed to the selectable graphical element, incorporating content that is responsive to the candidate query into the ongoing message exchange thread. Incorporating the content into the ongoing message exchange thread causes the content to be displayed to the first user via the first message exchange client and/or to be displayed to the second user via the second message exchange client.

In some implementations, incorporating the content into the ongoing message exchange thread comprises requesting that at least one of the message exchange clients insert the content into a transcript of the ongoing message exchange thread that is displayed in a graphical user interface of the at least one of the message exchange clients.

In some implementations, the content includes one or more of text and an image.

In some implementations, determining the candidate query includes selecting the candidate query from a corpus of queries based on conformance between one or more query terms of the candidate query and one or more message terms of the already communicated messages of the ongoing message exchange thread.

In some implementations, determining the candidate query includes determining at least one entity referenced in the already communicated messages of the ongoing message exchange thread and determining the candidate query based on the at least one entity. In some of those implementations, determining the candidate query based on the at least one entity includes generating one or more query terms for the candidate query based on an alias of the at least one entity.

In some implementations, determining the candidate query and providing the selectable graphical element occur independent of formulation by the user of any additional natural language input for inclusion in the message exchange thread.

In some implementations, the method further includes determining a score for the candidate query based on one or more terms of at least one of the already communicated messages of the ongoing message exchange thread. Providing the selectable graphical element may be based on the score satisfying a threshold. In some of those implementations, determining the score based on the one or more terms includes determining the score based on whether a named entity is included in the terms and/or determining the score based on whether a plurality of the terms conform to at least one predefined search query pattern.

In some implementations, the method further includes determining a score for the candidate query based on: a popularity measure for the candidate query that is based on a quantity of submissions of the candidate query; and/or a quality measure for the content that is responsive to the candidate query. Providing the selectable graphical element may be based on the score satisfying a threshold.

In some implementations, the method further includes submitting the candidate query to a search engine, receiving one or more search results in response to submitting the candidate query to the search engine, and determining the content to incorporate into the ongoing message exchange thread based on at least one of the search results. In some of those implementations, submitting the candidate query to the search engine is in response to the user interface input that is directed to the selectable graphical element.

In some implementations, incorporating the content into the ongoing message exchange thread includes incorporating the content into the ongoing message exchange thread with a graphical indication that the content is generated by an automated assistant.

In some implementations, the method further includes providing, for display to the first user via the first message exchange client, an additional selectable graphical element that identifies one or more terms and, that when selected, causes the one or more terms to be incorporated into the message exchange thread with an indication that the one or more terms originated from the first user and causes the one or more terms to be incorporated into the message exchange thread without incorporating any content that is responsive to the one or more terms.

In some implementations, providing the graphical element further includes providing the graphical element for display to the second user via the second message exchange client.

In some implementations, the content includes a selectable first content item focused on a first entity and a selectable second content item focused on a second entity. In some of those implementations, user interface input directed at the first content item causes additional first entity content focused on the first entity to be incorporated into the message exchange thread and/or user interface input directed at the second content item causes additional second entity content focused on the second entity to be incorporated into the message exchange thread.

In some implementations, the content includes a first image or text focused on a first entity and further includes at least one selectable deep link that, when selected, cause one or more additional computing actions to be performed that are specific to the first entity.

In some implementations, the method further includes determining an additional related query based on the candidate query and/or the content and, after the user interface input of the first user, providing, for display to at least the first user via the first message exchange client, an additional selectable graphical element that provides an indication of the additional related query. The additional selectable graphical element may be provided for display without simultaneous display of the graphical element. The method may further include, in response to additional user interface input of the first user that is directed to the additional selectable graphical element, incorporating additional content that is responsive to the additional related query into the ongoing message exchange thread. Incorporating the additional content into the ongoing message exchange thread causes the additional content to be displayed to the first user via the first message exchange client and/or to be displayed to the second user via the second message exchange client.

In addition, some implementations include one or more processors of one or more computing devices, where the one or more processors are operable to execute instructions stored in associated memory, and where the instructions are configured to cause performance of any of the aforementioned methods. Some implementations include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations of this specification are directed to providing at least one contextually relevant suggestion to one or more users of an ongoing message exchange thread between the users. The suggestion is provided for presentation to the user(s) via user interface output device(s) of computing device(s) of the user(s). The suggestion indicates a query that can be submitted to an automated assistant (e.g., submitted within the message exchange thread) to cause the automated assistant to incorporate, into the message exchange thread, content that is responsive to the query. In some implementations, the suggestion is a selectable suggestion (e.g., a selectable graphical element provided for display) and content that is responsive to the query is incorporated into the message exchange thread in response to user interface input (e.g., a "tap", a "click", a "verbal command") that is directed to the selectable suggestion. In some implementations, the suggestion is determined based on one or more messages that have already been communicated between users of the message exchange thread. For example, the query indicated by the suggestion may be determined based on one or more terms, images, and/or other content of the already communicated messages.

Figure 1:
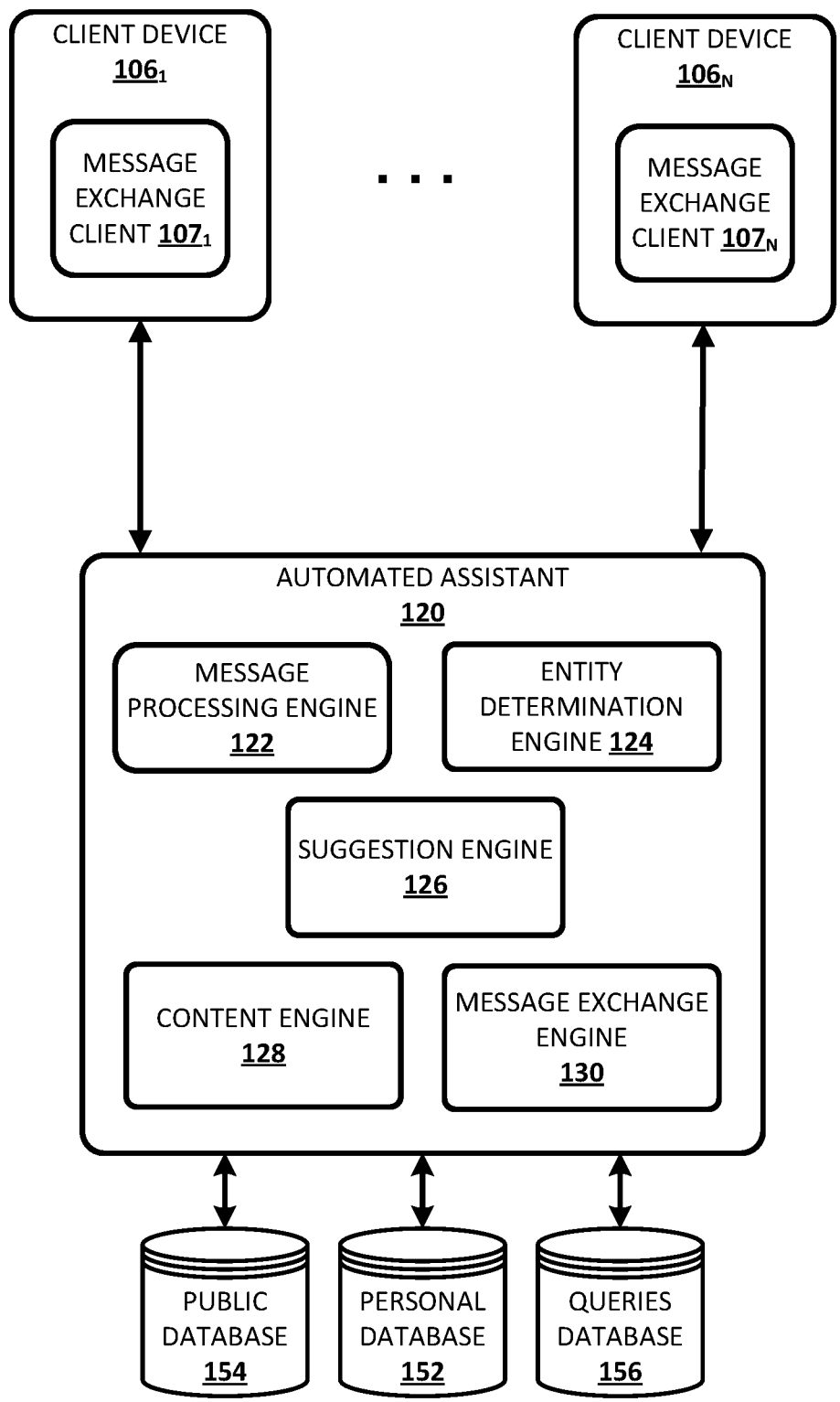
FIG. 1 is a diagram of an example environment in which implementations disclosed herein may be implemented.

Now turning to FIG. 1, an example environment in which techniques disclosed herein may be implemented is illustrated. The example environment includes a plurality of client computing devices $106_{1-N}$ and an automated assistant 120. Although automated assistant 120 is illustrated in FIG. 1 as separate from the client computing devices $106_{1-N}$, in some implementations all or aspects of the automated assistant 120 may be implemented by one or more of the client computing devices $106_{1-N}$. For example, client computing device $106_1$ may implement one instance of one or more aspects of automated assistant 120 and client computing device $106_N$ may also implement a separate instance of those one or more aspects of automated assistant 120. In implementations where one or more (e.g., all) aspects of automated assistant 120 are implemented by one or more computing devices remote from client computing devices $106_{1-N}$, the client computing devices $106_{1-N}$ and those aspects of automated assistant 120 may communicate via one or more networks such as a local area network (LAN) and/or wide area network (WAN) (e.g., the Internet).

The client computing devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device). Additional and/or alternative client computing devices may be provided.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by the automated assistant 120 may be distributed across multiple computer systems. Automated assistant 120 may be implemented as, for example, computer programs running on one or more computers in one or more locations that are coupled to each other through a network.

In some implementations, a given user may communicate with automated assistant 120 utilizing a plurality of client computing devices of the user that collectively form a coordinated "ecosystem" of computing devices. For example, a user may engage in an ongoing message thread via multiple computing devices of the user. For instance, the user may provide a first message for incorporation into the message thread via user interface input at a first computing device (e.g., a desktop computing device) and may later provide a second message for incorporation into the message thread via user interface input at a second computing device (e.g., a mobile computing device). However, for the sake of brevity, many examples described in this disclosure will focus on a given user operating a single one of the client computing devices $106_{1-N}$.

Each of the client computing devices $106_{1-N}$ may operate a variety of different applications, such as a corresponding one of the message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, and so forth. In some implementations, one or more of the message exchange clients $107_{1-N}$ may be implemented via a webpage or other resources rendered by a web browser (not depicted) or other application of a client computing device.

The automated assistant 120 examines one or more messages of an ongoing message exchange thread between multiple users that is occurring via multiple message exchange clients $107_{1-N}$ of those users. In some implementations, the automated assistant 120 serves as a central exchange that facilitates the message exchange thread between the users. In other implementations, the automated assistant 120 may not serve as a central exchange, but may still examine messages of an ongoing message exchange continuously, periodically, or at other regular and/or non-regular intervals. For example, the automated assistant 120 may be implemented in whole or in part on one or more client computing devices of users engaged in an ongoing message exchange and examine the message exchange via the client computing device(s). Also, for example, the automated assistant 120 may implemented in whole or in part on one or more computing devices that are remote from the client computing devices of users engaged in an ongoing message exchange—but may receive messages of the ongoing message exchange from one or more of the client computing devices and/or from another computing device that is facilitating the message exchange.

In some implementations, the automated assistant 120 determines, based on one or more of the examined messages, at least one contextually relevant suggestion to provide for presentation (e.g., for display as a graphical element) to one or more of those users via the message exchange clients $107_{1-N}$.

The suggestion determined by the automated assistant indicates a query that can be submitted to the automated assistant 120, via one of the message exchange clients $107_{1-N}$, to cause the automated assistant 120 and/or one or more message exchange clients, to incorporate, into the message exchange thread, content that is responsive to the query. For example, in response to user interface input that is directed to the suggestion and provided by one of the users of the message exchange thread, the automated assistant 120 may incorporate content that is responsive to the query into the message exchange thread. In some of those implementations, the user interface input directed to the suggestion may cause the query indicated by the suggestion to be submitted to the automated assistant 120, the automated assistant 120 may initiate a search based on the query, and the automated assistant 120 may determine the content based on one or more search results of the search. In some other implementations, the content responsive to the search may have been previously determined and may be implemented by the automated assistant 120 into the message exchange thread in response to receiving a query or other data in response to the user interface input directed to the suggestion. In yet other implementations, a user may type or speak the query indicated by the suggestion and submit the query to the automated assistant 120 without explicitly directing user interface input to the suggestion. In some of those implementations, the automated assistant 120 may likewise respond by incorporating the content into the message exchange thread.

In some implementations, the automated assistant 120 may provide a suggestion for presentation to a user independent of one or more user interface inputs provided by the user. For example, the suggestion may be provided independent of any natural language user interface input (e.g., typed or spoken) that is provided by the user in formulating a message for potential inclusion in the message exchange thread. For instance, in some implementations a suggestion may be determined based at least in part on a given message that is the most recent message of a message exchange thread and may be presented to one or more users prior to those users providing any user interface input that is directed to formulating an additional message that, if submitted to the message exchange, would become the most recent.

In some implementations, the suggestion may be provided automatically and independent of any user interface input. In some other implementations, the suggestion may be provided in response to certain user interface input, such as a user selection of a user interface element, a spoken command provided by the user, etc. For example, the suggestion may be provide in response to the user "tapping" or otherwise selecting a "reply area" in a graphical user interface rendered by one of the message exchange clients $107_{1-N}$. As another example, the suggestion may be provided in response to user interaction with a virtual button (e.g., a tap, a long tap), a verbal command (e.g., "Hey Personal Assistant, give me some suggestions"), etc.

In some implementations, whether and/or how the automated assistant 120 provides a suggestion may be based on a score for a query that is indicated by the suggestion. For example, the automated assistant 120 may automatically provide the suggestion for presentation if the score for the query satisfies a threshold, but may require user interface input before providing the suggestion if the score does not satisfy the threshold. Also, for example, the automated assistant 120 may: if the score satisfies a first threshold, automatically provide the suggestion for presentation; if the score doesn't satisfy the first threshold but satisfies a second threshold, require certain user interface input before providing the suggestion for presentation; and may, if the score doesn't satisfy the first threshold or the second threshold, not provide the suggestion under any circumstances. Additional description of implementations of determining a score for a query is provided herein.

In some implementations, automated assistant 120 may include a message processing engine 122, an entity determination engine 124, a suggestion engine 126, a content engine 128, and a message exchange engine 130. In some implementations, one or more of engines 122, 124, 126, 128, and/or 130 may be omitted. In some implementations, all or aspects of one or more of engines 122, 124, 126, 128, and/or 130 may be combined. In some implementations, one or more of engines 122, 124, 126, 128, and/or 130 may be implemented in a component that is separate from automated assistant 120. For example, one or more of engines 122, 124, 126, 128, and/or 130, or any operative portion thereof, may be implemented in a component that is executed by of the client computing devices $106_{1-N}$.

Message processing engine 122 processes one or more messages of a message exchange thread and generates annotated output for use by one or more other components of the automated assistant 120. For example, the message processing engine 122 may process free-form natural language input that is formulated by a user via one or more user interface input devices of client device $106_1$, and submitted to a message exchange thread by the message exchange client $107_1$. The generated annotated output of a message includes one or more annotations of content of the message and optionally at least some of the content itself.

In some implementations, the message processing engine 122 is configured to identify and annotate various types of grammatical information in natural language content of messages. For example, the message processing engine 122 may include a part of speech tagger configured to annotate terms with their grammatical roles. For example, the part of speech tagger may tag each term with its part of speech such as "noun," "verb," "adjective," "pronoun," etc. Also, for example, in some implementations the message processing engine 122 may additionally and/or alternatively include a dependency parser configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the message processing engine 122 may additionally and/or alternatively include an entity tagger configured to annotate entity references in content of a message (e.g., natural language content and/or images) such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on the content itself to resolve a particular entity and/or may optionally communicate with one or more resources to resolve a particular entity. For example, to resolve an entity in natural language content, the entity tagger may communicate with a knowledge graph or other entity database to resolve a particular entity. Also, for example, to resolve an entity in image content, the entity tagger may communicate with an image processing system, such as a convolutional neural network configured to identify one or more entities (e.g., entity classification(s)) present in an image.

In some implementations, the message processing engine 122 may additionally and/or alternatively include a coreference resolver configured to group, or "cluster," references to the same entity based on one or more contextual cues. For example, the coreference resolver may be utilized to resolve the term "it" to "Restaurant A" in the natural language input "I think Restaurant A sounds good. Where is it located?"

In some implementations, one or more components of the message processing engine 122 may rely on annotations from one or more other components of the message processing engine 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular message, one or more components of the message processing engine 122 may use one or more prior messages of a message exchange thread to determine one or more annotations for a given message of the message exchange thread. For example, a first user in a message exchange thread may incorporate a message of "How does Restaurant A sound?" into the thread and a second user may incorporate, into the message exchange thread, a responsive message of "Where is it located?". In processing "Where is it located", the coreference resolver may resolve "it" to "Restaurant A" based on the previous message of "How does Restaurant A sound?".

Entity determination engine 124 determines one or more entities that are referenced in one or more messages of a message exchange thread. In some implementations, the entity determination engine 124 may determine one or more entities that are "recently" referenced in the message exchange thread based on analysis of a subset of the messages of the message exchange thread. For example, the engine 124 may determine recently referenced entities based on the last N messages (e.g., the last 1, 2, or 4 messages) and/or based on message(s) that have been incorporated in the message exchange thread within a temporal threshold (e.g., within the last minute, the last 10 minutes).

In determining an entity referenced in one or more messages, the entity determination engine 124 may rely on the content of the message(s) and/or annotations provided by the message processing engine 122 (e.g., entity tags provided by an entity tagger of engine 122). The entity determination engine 124 may also utilize one or more additional resources in determining an entity, such as a knowledge graph or other entity database and/or user attribute(s) of one or more users that are engaged in the message exchange thread.

As one example, assume a most recent message of "what's the weather like then?" and an immediately preceding message of "any interest in a trip to Louisville in May for the Derby?" Based on the two messages, the entity determination engine 124 may determine an entity that corresponds to the city of Louisville in the state of Kentucky based on, for example, an entry for that entity in a knowledge graph having an "alias" property of "Louisville" and based on the entry having a strong relationship to an entry for an entity associated with the "Derby". The entity determination engine 124 may also optionally determine an entity corresponding to the month of May based on presence of the term "May" in a message and/or its syntactic relationship in the message (e.g., based on the annotations provided by engine 122). The entity determination engine 124 may also optionally determine an entity corresponding to "weather" based on presence of that term in a message. In some implementations, the entity determination engine 124 may be omitted.

The suggestion engine 126 determines, based on one or more messages of a message exchange thread, one or more suggestions that are contextually relevant to the one or more messages. The suggestion engine 126 may provide one or more of the determined suggestions for presentation (e.g., for display as a graphical element) to one or more of the users engaged in the message exchange thread (e.g., for presentation via one or more of the message exchange clients $107_{1-N}$). For example, the suggestions may be provided as graphical elements viewable by one or more of the users participating in the thread. For instance, the graphical elements may be displayed on graphical user interface(s) associated with one or more of the message exchange clients $107_{1-N}$ and may be displayed along with, but optionally not included in, a transcript of the ongoing message exchange thread. As used herein, a "transcript" may refer to a live record of text, images, sounds, etc. exchanged and/or viewed by one or more users participating in a message exchange thread. In some implementations, a transcript of a message exchange thread may be updated in real time or near real time as the users converse.

In some implementations, the suggestion engine 126 may provide the suggestions to message exchange engine 130, which may then provide the suggestion to one or more of the message exchange clients $107_{1-N}$. For example, the message exchange engine 130 may request that at least one of the message exchange clients $107_{1-N}$ provide the graphical elements in a graphical user interface rendered by the at least one of the message exchange clients $107_{1-N}$.

In some implementations, the suggestion engine 126 determines a suggestion based on annotated output determined by the message processing engine 122, based on one or more entities determined by the entity determination engine 124, and/or based on one or more queries of queries database 156. Queries database 156 may include, for example, one or more queries previously submitted to an automated assistant and/or a search engine, and/or one or more query "templates". Query templates may include one or more terms and one or more placeholders that may be "filled" in with an alias of a particular entity to generate a query. For example, a query template may take the form "actors in [movie]" and "movie" may be filled in with an alias of a particular movie to generate a query based on the template.

In some implementations, the suggestion engine 126 determines a candidate search query based on one or more messages of a message exchange thread, and generates a suggestion based on the candidate search query. For example, the suggestion may be a selectable graphical element that provides an indication of the candidate search query. The graphical element may include the entirety of the search query or a subgroup of terms of the search query or a rewrite of the search query (e.g., when the search query is longer than desired for display).

The suggestion engine 126 may utilize various techniques to determine the candidate search query. In some implementations, the suggestion engine 126 may determine the candidate search query based on one or more entities determined by the entity determination engine 124. For example, the suggestion engine 126 may determine one or more search queries that are strongly associated with one or more of the entities in one or more databases (e.g., in queries database 156). Also, for example, the suggestion engine 126 may determine one or more search queries based on an alias of one or more of the entities. For instance, as described above, the entity determination engine 124 may determine an entity that corresponds to the city Louisville in the state of Kentucky based on a message of "what's the weather like then?" that follows a message of "any interest in a trip to Louisville in May for the Derby?". The suggestion engine 126 may determine a candidate query of "Louisville, Ky. weather in May" based on an alias ("Louisville, Ky.") of the entity determined by engine 124, based on terms of the messages ("weather", "May"), and based on the annotated output provided by message processing engine 122 (e.g., to determine that "then" is a reference to "May").

In some implementations, the suggestion engine 126 may additionally and/or alternatively determine the candidate search query based on selecting it from a corpus of previously submitted search queries, such as queries of queries database 156. The candidate search query may be selected, for example, based on conformance between the candidate search query and term(s) included in the messages of the message exchange thread, conformance between the candidate query and alias(es) of an entity determined by the entity determination engine 124, and/or based on a popularity measure of the search query (e.g., based on a frequency of submission of the candidate query or other measure indicative of a quantity of submissions of the candidate query).

In some implementations, the suggestion engine 126 may additionally and/or alternatively determine the candidate search query based on identifying a query template that is associated with, in queries database 156, one or more terms and/or entities (e.g., determined by entity determination engine 124) of the messages. The suggestion engine 126 may further generate the candidate query by populating the placeholder(s) of the query template with one or more appropriate terms. For example, assume a query template of "nearby [cuisine type] restaurants" is associated with one or more entities such as an entity class of "restaurants", an entity class of "cuisine type", and/or is associated with one or more terms such as "food", "dinner", "reservations", "restaurant", "seafood", "barbecue", etc. The suggestion engine 126 may identify that query template based on a message exchange that includes a message of "Anybody want to grab lunch?—I'm in the mood for barbecue". The suggestion engine 126 may further populate the "[cuisine type]" placeholder with "barbecue" based on barbecue being a cuisine type and being a term included in the message.

In some implementations, whether suggestion engine 126 provides a suggestion may be based on a score for a query that is indicated by the suggestion. For example, in some implementations the suggestion engine 126 may determine a group of one or more candidate queries utilizing one or more techniques, such as those described herein. In some of those implementations, the suggestion engine 126 may determine scores for each of the candidate queries of the group and only provide suggestions based on those candidate queries (if any) that have a score that satisfies a threshold.

In some implementations, the suggestion engine 126 may additionally and/or alternatively utilize the score for a candidate query to determine how a suggestion that indicates that candidate query is provided. For example, in some implementations the suggestion engine 126 may use the score of a candidate query to determine a display order, a size, and/or other visual prominence of a suggestion provided as a graphical element that indicates the candidate query. Also, for example, in some implementations the suggestion engine 126 may automatically provide the suggestion for presentation if the score for the candidate query satisfies a threshold, but may require user interface input before providing the suggestion if the score does not satisfy the threshold. Also, for example, the suggestion engine 126 may: if the score satisfies a first threshold, automatically provide the suggestion for presentation; if the score doesn't satisfy the first threshold but satisfies a second threshold, require certain user interface input before providing the suggestion for presentation; and may, if the score doesn't satisfy the first threshold or the second threshold, not provide the suggestion under any circumstances.

In some implementations, the suggestion engine 126 determines the score for a candidate query based on: (1) one or more properties of the candidate query itself; (2) one or more properties of search results that are responsive to the candidate query; and/or (3) one or more properties of one or more of the messages of the ongoing message exchange thread. The one or more properties of the candidate query may include, for example, a popularity measure of the candidate query. The one or more properties of the one or more search results that are responsive to the candidate query may include, for example, quality measure(s) for the search result(s) and/or whether the search result(s) are of certain type(s) such as a navigational search result, a "curated" search result, a "knowledge card" search result, etc.

The one or more properties of one or more of the messages of the ongoing message exchange thread may include, for example, a measure of "chattiness" and/or a measure of "searchiness" of one or more of the messages, such as the most recent message or the most recent N messages. In some implementations, a measure of "searchiness" of a message may be determined based on comparing terms and/or syntactic structure of the message to terms and/or syntactic patterns of previously submitted search queries. For example, the syntactic structure of a message may be compared to a syntactic structure that is common in searches submitted to a search engine and, if there is a high degree of conformance, it may indicate the message is "searchy". Also, for example, the presence of and/or absence of certain terms in a message may indicate the message is "searchy", such as the presence of "what", "when", "?", etc. Also, for example, the presence of any named entity, the presence of a certain quantity of named entities, and/or the presence of certain classes of named entities in a message may indicate the message is "searchy".

In some implementations, a measure of "chattiness" of a message may be determined based on comparing terms and/or syntactic structure of the message to terms and/or syntactic patterns of previous message exchanges between two or more users. For example, the syntactic structure of a message may be compared to a syntactic structure that is common in previous message exchanges between users and, if there is a high degree of conformance, it may indicate the message is "chatty". Also, for example, the presence of and/or absence of certain terms in a message may indicate the message is "chatty". Also, for example, the absence of any named entity and/or of certain classes of named entities in a message may indicate the message is "chatty".

In some implementations, the suggestion engine 126 may utilize a trained classifier and/or other machine learning system to determine a measure of "chattiness" and/or "searchiness". For example, a classifier may be trained to receive, as input, one or more features of one or more messages, such as term(s) of the message(s), annotations of the messages (e.g., annotations provided by engine 122), etc. —and to provide, as output, an indication of whether and/or to what degree the message(s) are "searchy" (i.e., indicate a desire for search results) and/or "chatty" (i.e., indicate a desire for further communications with one or more users).

Content engine 128 determines content that is responsive to a query directed to the automated assistant 120, such as a query directed to the automated assistant 120 in response to a user selecting or otherwise interacting with a suggestion that is based on that query. The content may include, for example, documents, images, textual content, and/or other information that is responsive to the query and may be identified, for example, from public database 154 and/or personal database 152. In various implementations, content responsive to a search query may further include further suggestions that are related to other determined content.

In some implementations, the content engine 128 may submit the query to a separate search engine (not depicted) and obtain one or more search results in response to the submission. In some implementations, the search engine may search one or more public content resources, such as public database 154. In some implementations, the search engine may additionally and/or alternatively search one or more personal content resources that are personal to the user that submitted the query (and/or other users of the message exchange thread), such as personal database 152. For example, personal database 152 may include entries that are personal to a user such as calendar entries of the user, contact entries of the user, emails of the user, content derived from emails of the user, etc. The search engine may access the personal database 152 (or a subset of entries of the database 152 that are personal to the user) based on, for example, user authorization information provided by the content engine 128 along with a query submission. In some other implementations, the content engine 128 itself may perform the search of the public database 154, personal database 152, and/or other resource based on a query.

In many instances, the content that is responsive to a query may be too unwieldy (e.g., too long, too much detail, etc.) to feasibly incorporate into the message exchange thread without disrupting the flow of the conversation. In such situations, the content engine 128 may select a subset of the total responsive content (i.e., the total responsive content may be culled) for incorporation into the thread. In some implementations, content engine 128 may select the subset (or cull the responsive content) for incorporation into the message exchange thread. In other implementations, content engine 128 may provide the comprehensive responsive information to one or more of the message exchange clients 107$_{1-N}$, and they may perform the culling. For example, in some implementations, message exchange client 107$_1$ may cull the information based on a screen size of the client computing device 106$_1$. In yet other implementations, both content engine 128 and a message exchange client may perform culling. In some implementations, the top N search results (or other content) may be selected for incorporation into the message exchange thread and/or certain types of search results (or other content) may be selected for incorporation into the message exchange thread. N may be selected based on, for instance, screen size, user preferences, etc., or may be manually selected (e.g., N could be set to five, ten, two, one, etc.)

In various implementations, at least some of the content incorporated into a message exchange thread in response to a query may link to one or more electronic documents that are responsive to the query, such that a user need only select that content to be directed to a new resource (e.g., a web browser displaying the information). In some implementations, at least some of the content incorporated into a message exchange thread may link to an application, installed on a client computing device 106 operating at least one of the message exchange clients 107, that is responsive to the query. For example, if a user selects a suggestion indicating a query of "dinner reservations at Franks", one or more graphical elements related to the location "Franks" may be incorporated into the message exchange thread and those graphical elements may be selectable to open another application that is operable specifically to create a reservation at the location Franks (e.g., a deep link).

Message exchange engine 130 may facilitate incorporation of content (determined by content engine 128) into a message exchange thread and/or may facilitate the providing of suggestions (determined by suggestion engine 126) for display via one or more message exchange clients.

Content incorporated into a message exchange thread may be viewable by one or more of the users participating in the thread. For example, the content may be viewable on a graphical user interface associated with a message exchange client that depicts a transcript of the ongoing message exchange thread. Message exchange engine 130 may incorporate content into a message exchange thread between multiple message exchange clients 107$_{1-N}$ in a variety of ways. In some implementations, message exchange engine 130 may request that at least one of the message exchange clients 107$_{1-N}$ participating in the message exchange thread insert the content into a transcript of the ongoing message exchange thread that is displayed in a graphical user interface. In some scenarios, the content can be incorporated into transcripts rendered by more than one message exchange client, such as in transcripts rendered by all message exchange clients participating in the message exchange thread. In some implementations, message exchange engine 130 may simply provide responsive content to a message exchange client, which may then select what content to incorporate into the message exchange thread.

Figure 2A:
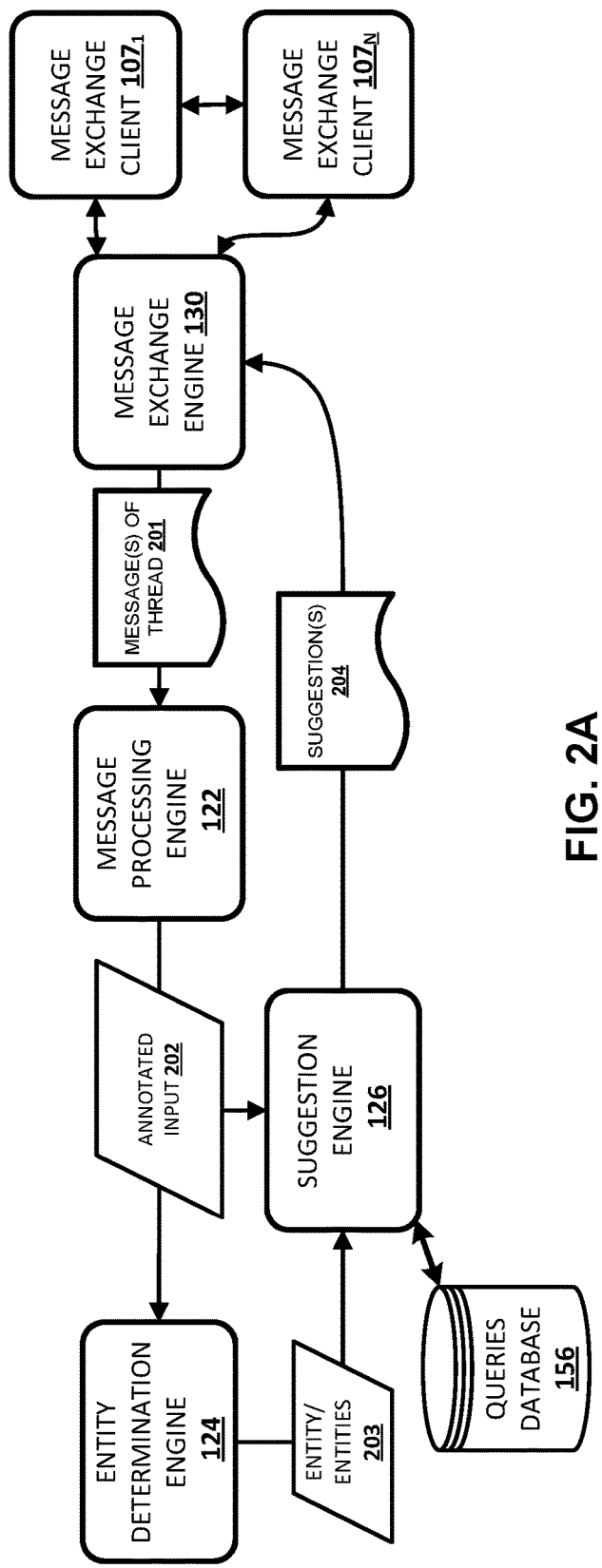
FIG. 2A illustrates an example of providing at least one contextually relevant suggestion to one or more users of an ongoing message exchange thread between the users.
Figure 2B:
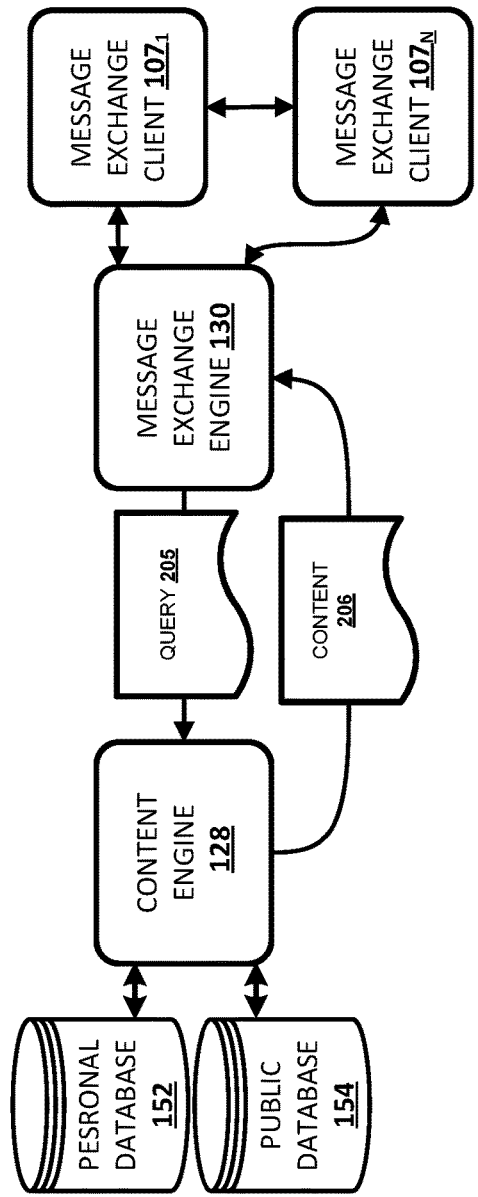
FIG. 2B illustrates an example of incorporating content that is responsive to a query into a message exchange thread in response to user interface input of one of the users of the message exchange thread, such as user interface input that is directed to a suggestion that is provided to the user and that indicates the query.

Turning now to FIGS. 2A and 2B, additional description is provided of various components of automated assistant 120.

In FIGS. 2A and 2B, a message exchange thread is ongoing between message exchange client 107$_1$ and message exchange client 107$_N$. In FIG. 2A message exchange engine 130 obtains one or more messages of the thread 201 and provides those to the message processing engine 122. In some implementations, the message exchange engine 130 may serve as a central exchange that facilitates the message exchange thread between the message exchange clients 107$_1$ and 107$_N$. In other implementations, the message exchange engine 130 may not serve as a central exchange, but may still obtain the message(s) of the thread 201.

The message processing engine 122 processes the message(s) of the thread 201 and generates various annotations of the message(s) of the thread 201. The message processing engine 122 provides annotated input (e.g., terms and/or other content of the message(s) of the thread 201 and generated annotations) 202 to entity determination engine 124 and to suggestion engine 126.

The entity determination engine 124 determines one or more entities 203 referenced in the messages of the thread 201 based on the annotated input 202, an entity database, and/or other resources. The entity determination engine 124 provides the one or more entities 203 to the suggestion engine 126.

The suggestion engine 126 determines one or more suggestions 204 and provides the suggestions 204 to the message exchange engine 130. The message exchange engine 130 provides the suggestions 204 for display via one or both of the message exchange clients $107_1$ and $107_N$. In some implementations, one or more of the suggestions 204 may be a selectable graphical element that includes the terms of a candidate search query and/or that otherwise indicates the candidate search query. In some implementations, one or more of the suggestions 204 may be provided as audible suggestions.

As described herein, the suggestion engine 126 may utilize one or more of various techniques to determine the suggestions. For example, the suggestion engine 126 may determine a candidate search query based on the annotated input 202, the entities 203, and/or the queries database 156, and may generate the suggestion based on the candidate search query. In some implementations, the suggestion engine 126 determines a score for the candidate queries associated with the suggestions 204 and determines whether to provide the suggestions 204 based on the scores. In some implementations, the suggestion engine 126 utilize the scores to determine how the suggestions 204 are to be provided. For example, the suggestion engine may utilize the scores to generate computer readable instructions, for providing with the suggestions 204, that dictate particular display positions of the suggestions 204, particular display sizes of the suggestions 204, and/or other particular display properties of the suggestions 204.

FIG. 2B illustrates an example of incorporating content that is responsive to a query into a message exchange thread in response to user interface input of one of the users of the message exchange thread, such as user interface input that is directed to a suggestion that is provided to the user and that indicates the query.

For example, in FIG. 2B message exchange engine 130 may receive query 205 in response to user interface input directed to one of the provided suggestions 204 provided in FIG. 2A (i.e., that suggestion may indicate the query 205). As described with respect to FIG. 2A, the suggestion may be provide for display via one or both of the message exchange clients $107_1$ and $107_N$. The query 205 may be provided to message exchange engine 130 in response user interface input directed at the suggestion via either of the message exchange clients $107_1$ and $107_N$ to which the suggestion was provided.

The message exchange engine 130 provides the query 205 to content engine 128, which obtains content 206 that is responsive to the query 205. The content 206 may be obtained, directly or indirectly by the content engine 128, from personal database 152 and/or public database 154. In some implementations, the content engine 128 determine a set of search results or other content in response to submission of the query 205, and culls that content to generate content 206. The content engine 128 provides the content to message exchange engine 130. Message exchange engine 130 incorporates the content 206 into the ongoing message exchange thread between the message exchange clients $107_1$ and $107_N$. For example, the content 206 may be incorporated into the message exchange thread for display as part of the message exchange thread in both of the message exchange clients $107_1$ and $107_N$.

Turning now to FIGS. 3A-3D, additional description is provided of various components and techniques described herein. FIG. 3A-3D each illustrate the client computing device $106_1$ of FIG. 1 with a display screen 140 illustrating an example of how the client computing device $106_1$ may render a graphical user interface of the message exchange client $106_1$ during a message exchange thread. In FIGS. 3A-3D a user of the client computing device $106_1$ is engaged in an ongoing message exchange thread with two other users, "Tom" and "Alex".

The display screen 140 of FIGS. 3A-3D further includes a textual reply interface element 388 that the user may select to generate user input via a virtual keyboard and a voice reply interface element 389 that the user may select to generate user input via a microphone. The display screen 140 also includes system interface elements 381, 382, 383 that may be interacted with by the user to cause the computing device $106_1$ to perform one or more actions.

Figure 3A:
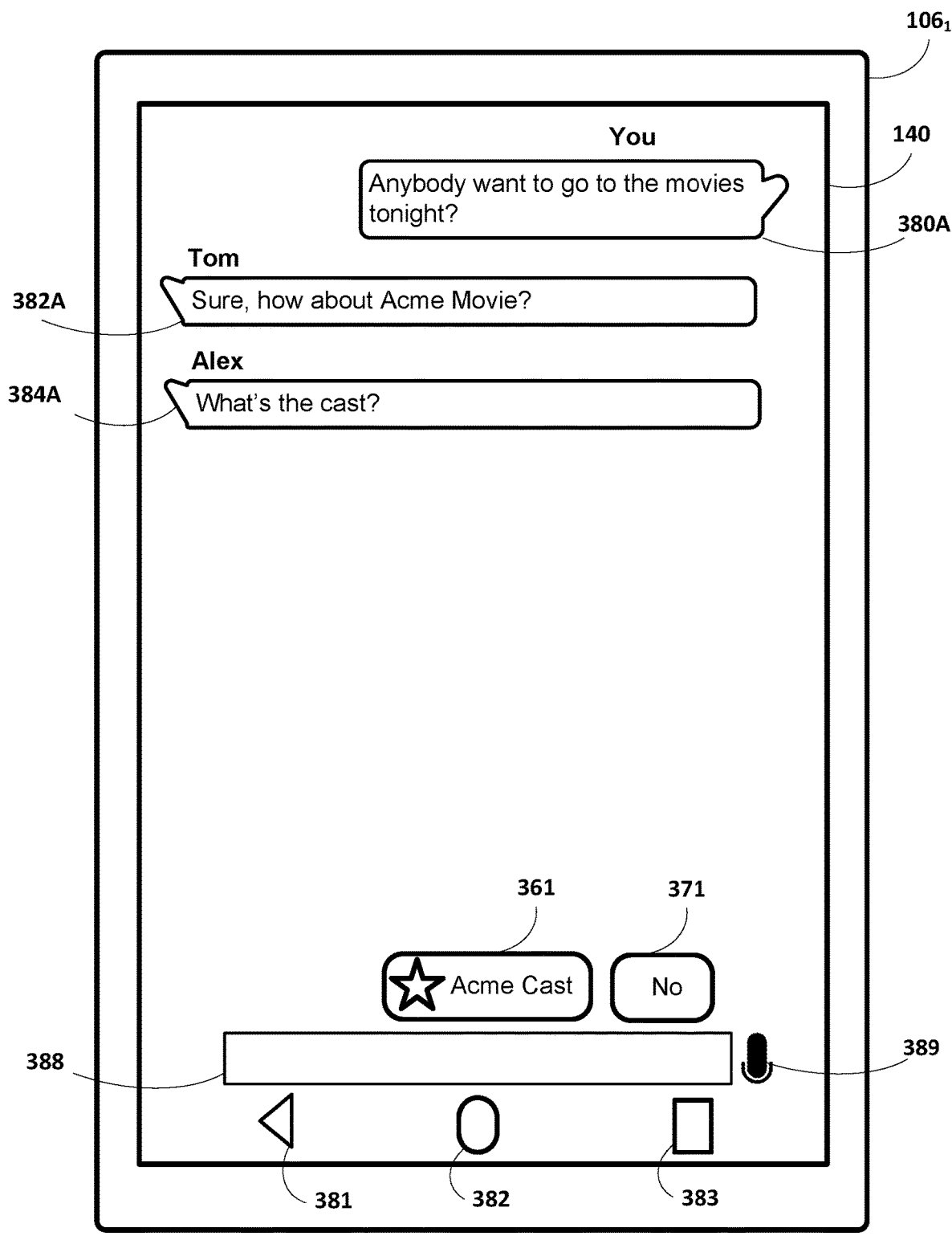
FIGS. 3A, 3B, 3C, and 3D illustrate examples of how a client computing device may render a graphical user interface for a message exchange client, in accordance with various implementations.

In FIG. 3A the user has previously formulated a natural language message 380A and submitted the message 380A for incorporation in the message exchange thread. Further, Tom has previously formulated a natural language message 382A and submitted the message 382A for incorporation into the message exchange thread after incorporation of the message 380A. Alex has also previously formulated a natural language message 384A and submitted the message 384A for incorporation into the message exchange thread after incorporation of the message 382A.

A selectable graphical element 361 that indicates a candidate query of "Acme Cast" that may be submitted to the automated assistant 120 is also illustrated in FIG. 3A. The graphical element 361 includes the text of the candidate query and also includes a "star" to indicate to the user that selection of the graphical element 361 will result in incorporation, into the message exchange thread, of content that is responsive to the candidate query "Acme Cast". A selectable graphical element 371 is also shown that includes the text "No". Selection of graphical element 371 will cause "No" to be auto populated in textual reply interface element 388 (that the user can then submit for incorporation in the thread via one or more user interface inputs) or will cause "No" to be automatically submitted for incorporation in the message exchange thread. In either scenario, "No" will be incorporated into the message exchange thread as a reply from the user and without causing content that is responsive to "No" to also be incorporated. In other words, selection of graphical element 371 may enable the user to generate a reply of "No" just as if the user had typed "No" in textual reply interface element 388 and/or spoken "No" after selection of voice reply interface element 385.

In some implementations, the automated assistant 120 may determine the candidate search query "Acme Cast" that is indicated by graphical element 361 based on one or more of the already communicated messages 380A, 382A, and 384A of the message exchange thread. For example, the candidate search query may be determined based on presence of the term "Acme" (a fictional name of a movie) in the message 382A from Tom and based on presence of the term "cast" in the message 384A from Alex.

It is noted that in some implementations the message exchange client of Tom may also display the graphical element 371 and/or the graphical element 361 for selection by Tom. Also, the message exchange client of Alex may also display the graphical element 361 for selection by Alex (graphical element 371 may not be displayed to Alex since "no" would not be a contextually appropriate response for Alex to his own message 384A).

Figure 3B:
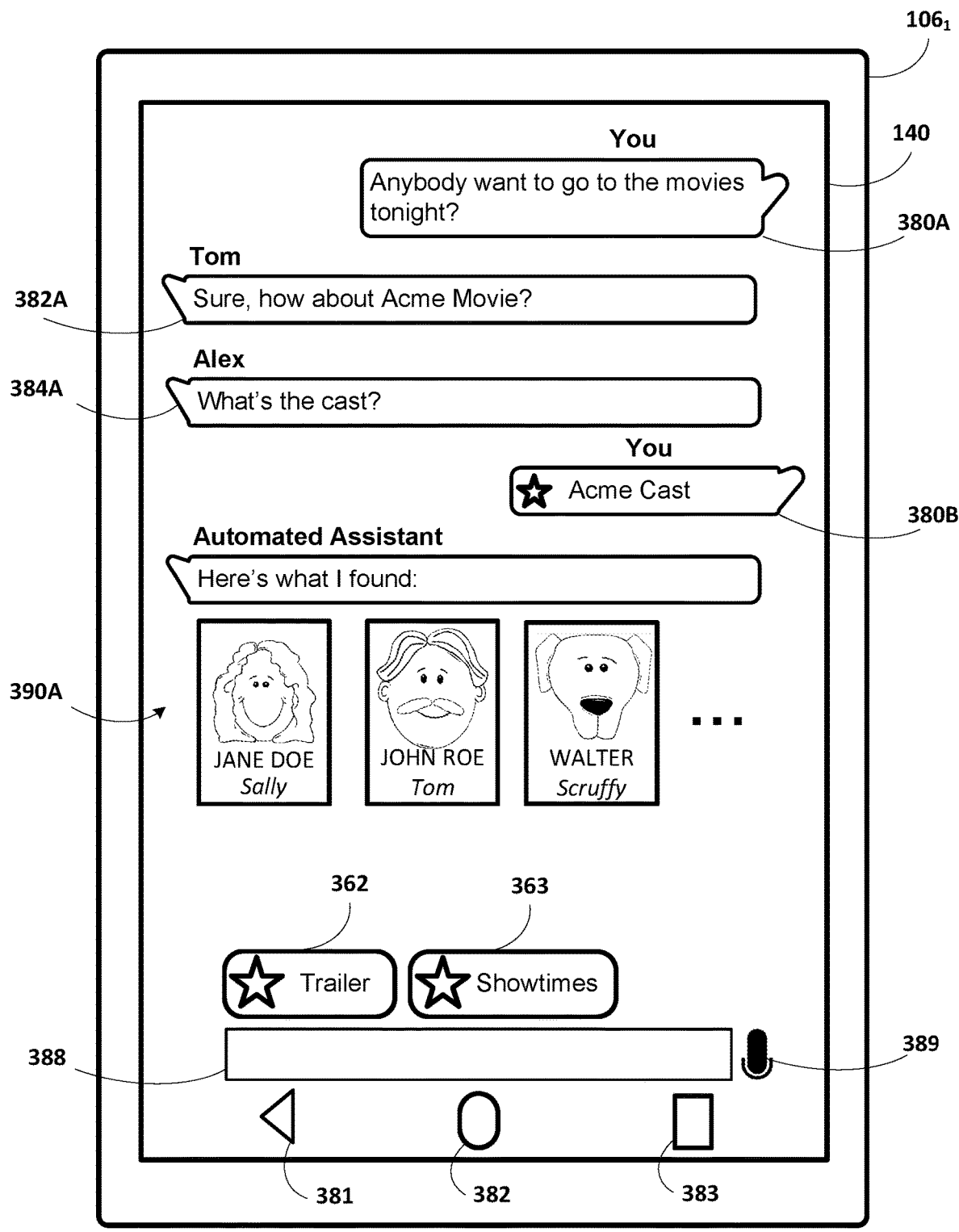

FIG. 3B shows the graphical user interface after the user has provided user interface input directed toward the graphical element 361 in FIG. 3A. For example, the user may have "tapped" the graphical element 361. In FIG. 3B, the users selection of graphical element 361 is incorporated in the message exchange thread as a message 380B from the user that includes the text of the candidate query "Acme Cast", along with the star to indicate that the message 380B was provided to obtain content that is responsive to "Acme Cast" for incorporation into the message exchange thread. For example, the message exchange client of computing device 106$_1$ may incorporate the message 380B by submitting "Acme Cast" along with an indication that causes the automated assistant 120 to process "Acme Cast" as a query directed to the automated assistant 120. The indication may be a human recognizable indication and/or non-human recognizable indication. It is noted that in some implementations the message exchange client of Tom and/or Alex may also display the message 380B (along with an indication of the user's name instead of "you").

Content 390A is also incorporated into the message exchange thread in FIG. 3B as a message from "Automated Assistant". The content 390A includes the text "Here's what I found:" to indicate that the content is responsive to the message 380B and includes three "cards" and a selectable option (" . . . ") that are responsive to the query "Acme Cast". The cards are for three of the cast members of "Acme Movie" and the selectable option (" . . . ") enables the user to see additional cards for additional cast members. Each of the cards includes an image of the cast member, a "known" name of the cast member, and the cast member's name in "Acme Movie" (shown in italics). It is noted that in some implementations the message exchange client of Tom and/or Alex may also display the content 390A. In some of those implementations, user interface input of any one of the users that is directed to the selectable option (" . . . ") to see additional cards for additional cast members may cause the additional cards to be displayed in the graphical user interface of all of the message exchange clients, or in only the client of the user that provided the user interface input. In some implementations, one or more of the cards may be selected by the user to cause additional content about the cast member of that card to be provided. For example, selection of one of the cards may cause additional content to be incorporated into the message exchange thread for the user and optionally for additional users. Also, for example, selection of one of the cards may cause additional content to be provided to the user in another application that is separate from the message exchange client, such as a separate web browser application.

Selectable graphical elements 362 and 363 are also shown in FIG. 3B and indicate candidate queries of "Acme Trailer" and "Acme Showtimes" that may be submitted to the automated assistant 120. The graphical elements 362 and 363 each includes text that indicates its candidate query (but doesn't include the entirety of the text of the candidate query) and also each includes a "star" to indicate to the user that selection will result in incorporation, into the message exchange thread, of content that is responsive to its candidate query. As with graphical element 361 (FIG. 3A), the message exchange client of Tom and/or Alex may also display the graphical elements 362 and 363. In some implementations, the automated assistant 120 may determine the candidate queries of graphical elements 362 and 363 based on those candidate queries being related to the candidate query "Acme Movie" and/or related to the content 390A. For example, the automated assistant 120 may determine those candidate queries based on a database entry indicating that those candidate queries are the two queries submitted by other users most frequently following and/or preceding submission of "Acme Showtimes".

Figure 3C:
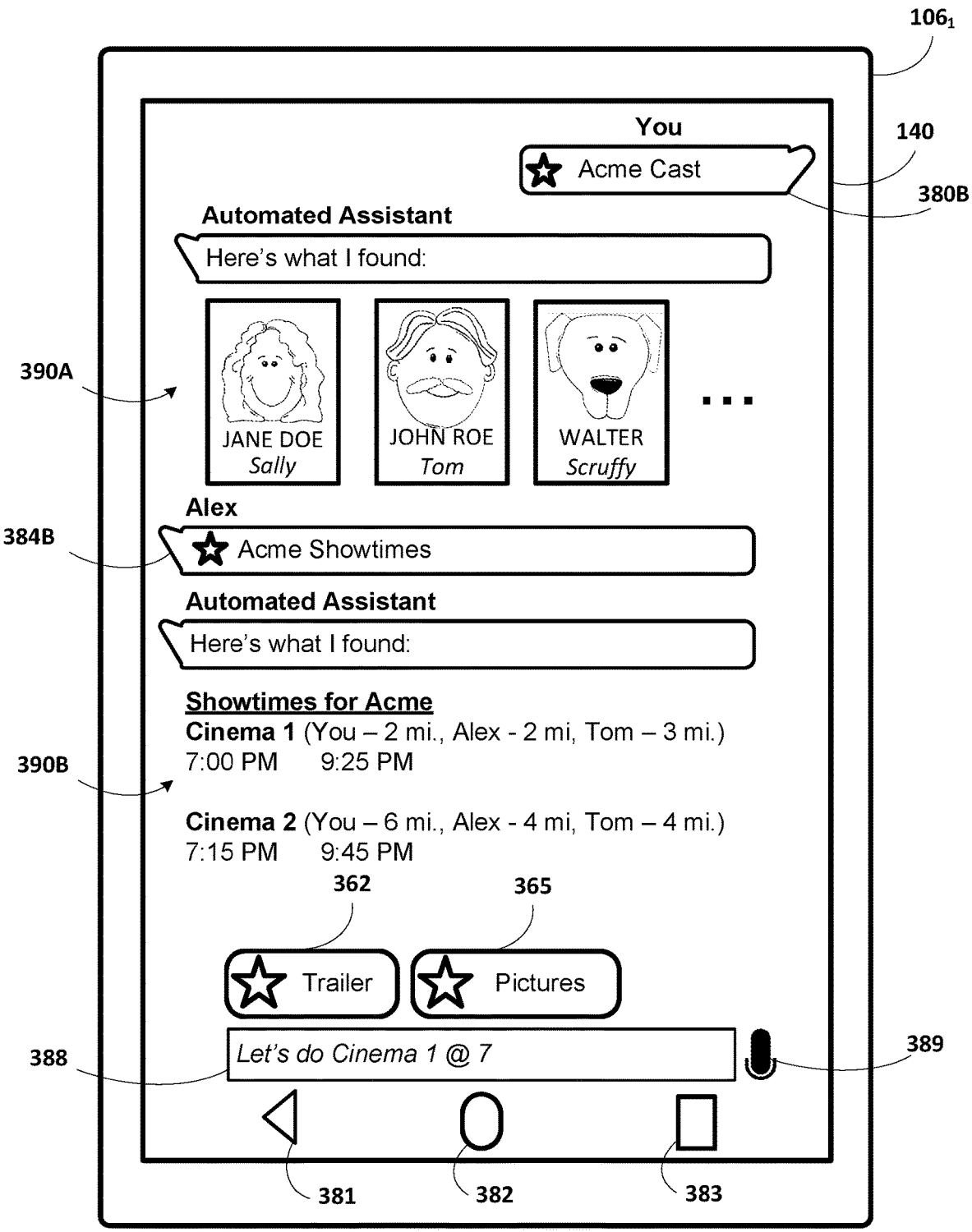

FIG. 3C shows the graphical user interface after Alex has provided user interface input (e.g., a "tap") directed toward an instance of the graphical element 363 that is displayed in his graphical user interface. In FIG. 3C, Alex's selection of graphical element 363 is incorporated in the message exchange thread as a message 384B from Alex that includes the text of the candidate query "Acme Showtimes", along with the star to indicate that the message 384B was provided to obtain content that is responsive to "Acme Cast" for incorporation into the message exchange thread.

Content 390$_6$ is also incorporated into the message exchange thread in FIG. 3C as a message from "Automated Assistant". The content 390$_6$ includes the text "Here's what I found:" to indicate that the content is responsive to the message 384B and includes natural language output indicating Showtimes for "Acme Movie" at two movie theatres. It is noted that in FIG. 3C, the two movie theatres are locationally proximal to Tom, Alex, and the user—and the natural language output of the content 390$_6$ includes an indication of the distance of Tom, Alex, and the user to each of the movie theatres. For example, the automated assistant 120 may determine content based on issuing a search with locational information and/or other user attributes for each of the users of the message exchange thread, to determine content 390B that is also contextually relevant to locations of the users and/or other attributes of the users that may not be discernible from the messages of the message exchange thread.

Selectable graphical elements 362 and 365 are also shown in FIG. 3C and indicate candidate queries of "Acme Trailer" and "Acme Pictures" that may be submitted to the automated assistant 120. The graphical elements 362 and 365 each includes text that indicates its candidate query and also each includes a "star" to indicate to the user that selection will result in incorporation, into the message exchange thread, of content that is responsive to its candidate query. In some implementations, the automated assistant 120 may determine the candidate queries of graphical elements 362 and 365 based on those candidate queries being related to the candidate query "Acme Showtimes" and/or related to the content 390$_6$.

In FIG. 3C, natural language input of "Let's do Cinema 1 @ 7" is shown in textual reply interface element 388 and may be formulated by the user. For example, the user may have utilized a virtual keyboard to provide the natural language input after the content 390B was incorporated into the message exchange thread.

Figure 3D:
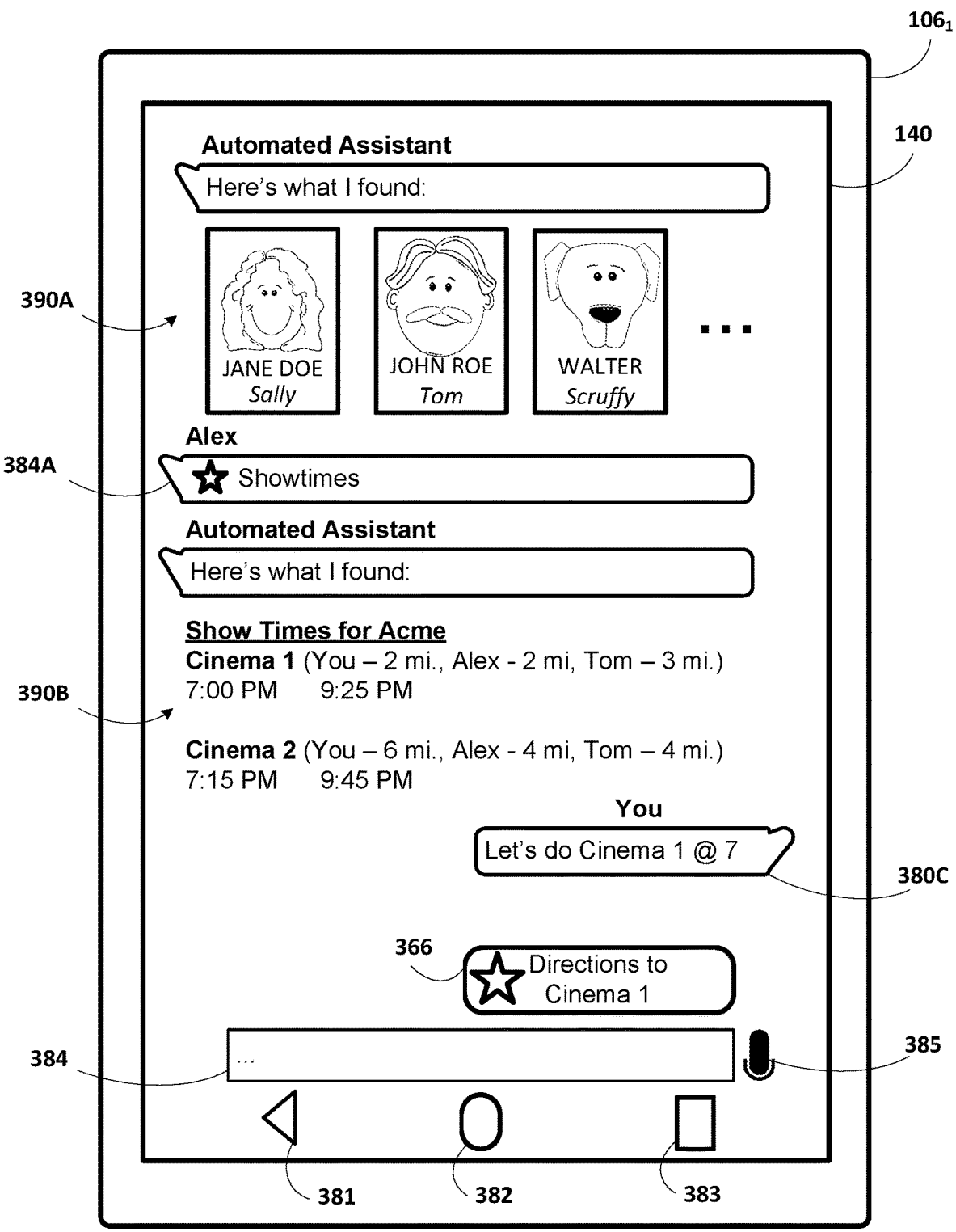

FIG. 3D shows the graphical user interface after the user has submitted the natural language input of "Let's do Cinema 1 @ 7" into the message exchange thread. In FIG. 3D, the users submission of the natural language input is incorporated in the message exchange thread as a message 380C from the user that does not include the star to indicate that the message is from the user and is not intended to obtain responsive content from an automated assistant. It is noted that in many implementations the message exchange client of Tom and/or Alex will also display the message 380C (along with an indication of the user's name instead of "you").

A selectable graphical element 366 that indicates a candidate query of "Directions to Cinema 1" that may be submitted to the automated assistant 120 is also illustrated in FIG. 3D. The graphical element 366 includes the text of the candidate query and also includes a "star" to indicate to the user that selection of the graphical element 366 will result in incorporation, into the message exchange thread, of content that is responsive to the candidate query "Directions to Cinema 1".

In some implementations, the automated assistant 120 may determine the candidate search query "Directions to Cinema 1" that is indicated by graphical element 366 based on one or more of the already communicated messages, such as message 380C and/or based on content 3906.

Although not illustrated in FIGS. 3A-3D, in some implementations the user and/or other users of the message exchange thread may explicitly submit queries to the automated assistant 120 without selecting a provided suggestion. For example, the user may formulate natural language input in textual reply interface element 388 and include certain terms and/or symbols (e.g., @automatedassistant as a prefix) in combination with the input to cause that input to be submitted to the automated assistant 120 (e.g., to show up as a message with a "star" that is replied to with content responsive to the input). Also, for example, the user may formulate natural language input verbally after selecting the voice reply interface element 389 and may speak a certain term in combination with the input to cause that input to be submitted to the automated assistant 120. As yet another example, a separate graphical interface element may be provided in the graphical user interface that, when selected, causes user formulated natural language input to be submitted to the automated assistant 120.

Figure 4:
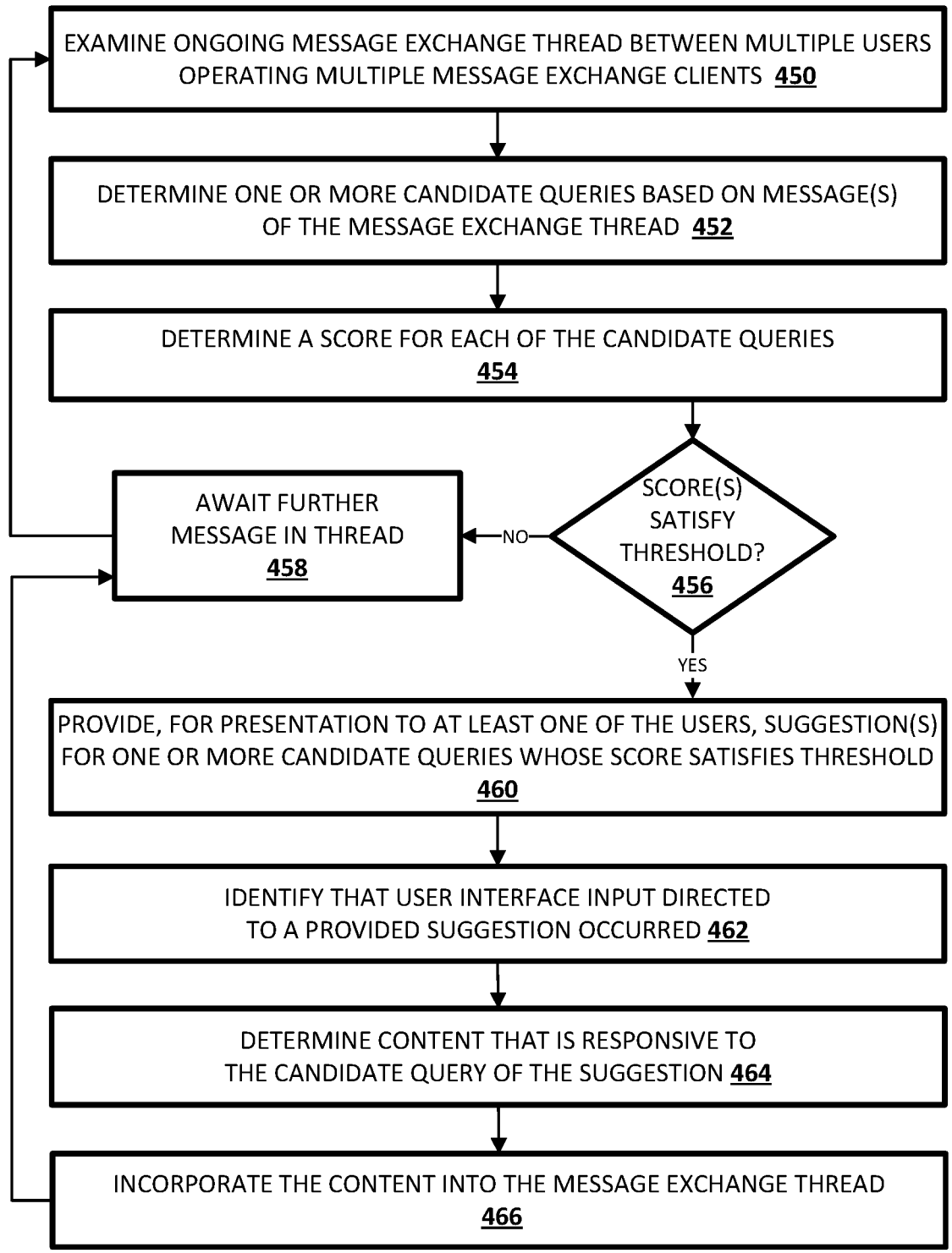
FIG. 4 depicts a flow chart illustrating an example method of providing at least one contextually relevant suggestion to one or more users of an ongoing message exchange thread between the users and incorporating, into the message exchange thread, content that is responsive to a query indicated by the suggestion.

FIG. 4 depicts a flow chart illustrating an example method 400 of providing at least one contextually relevant suggestion to one or more users of an ongoing message exchange thread between the users and incorporating, into the message exchange thread, content that is responsive to a query indicated by the suggestion. For convenience, the operations of the flow chart are described with reference to a system that performs the operations. This system may include various components of various computer systems, such as automated assistant 120. Moreover, while operations of method 400 are shown in a particular order, this is not meant to be limiting. One or more operations may be reordered, omitted or added.

At block 450, the system examines an ongoing message exchange thread between multiple users operating multiple message exchange clients.

At block 452, the system determines one or more candidate queries based on one or more messages of the message exchange thread.

At block 454, the system determines a score for each of the candidate queries.

At block 456, the system determines, for each of the candidate queries, whether the score of the candidate query satisfies a threshold. If the system determines at block 456 that none of the candidate queries has a score that satisfies the threshold, the system proceeds to block 458 and awaits a further message in the message exchange thread. In response to another message in the message exchange thread, the system may again proceed to block 450.

If the system determines at block 456 that at least one of the candidate queries has a score that satisfies the threshold, the system proceeds to block 460.

At block 460, the system provides, for presentation to at least one of the users of the message exchange thread, one or more suggestions for one or more candidate queries whose score satisfies a threshold.

At block 462, the system identifies that user interface input occurred that was directed to one of the provided suggestions.

At block 464, the system determines content that is responsive to the candidate query of the suggestion to which the user interface input was directed.

At block 466, the system incorporates the content into the message exchange thread and proceeds to block 458. At block 458, the system awaits a further message in the message exchange thread and, in response to another message in the message exchange thread, the system may again proceed to block 450.

Figure 5:
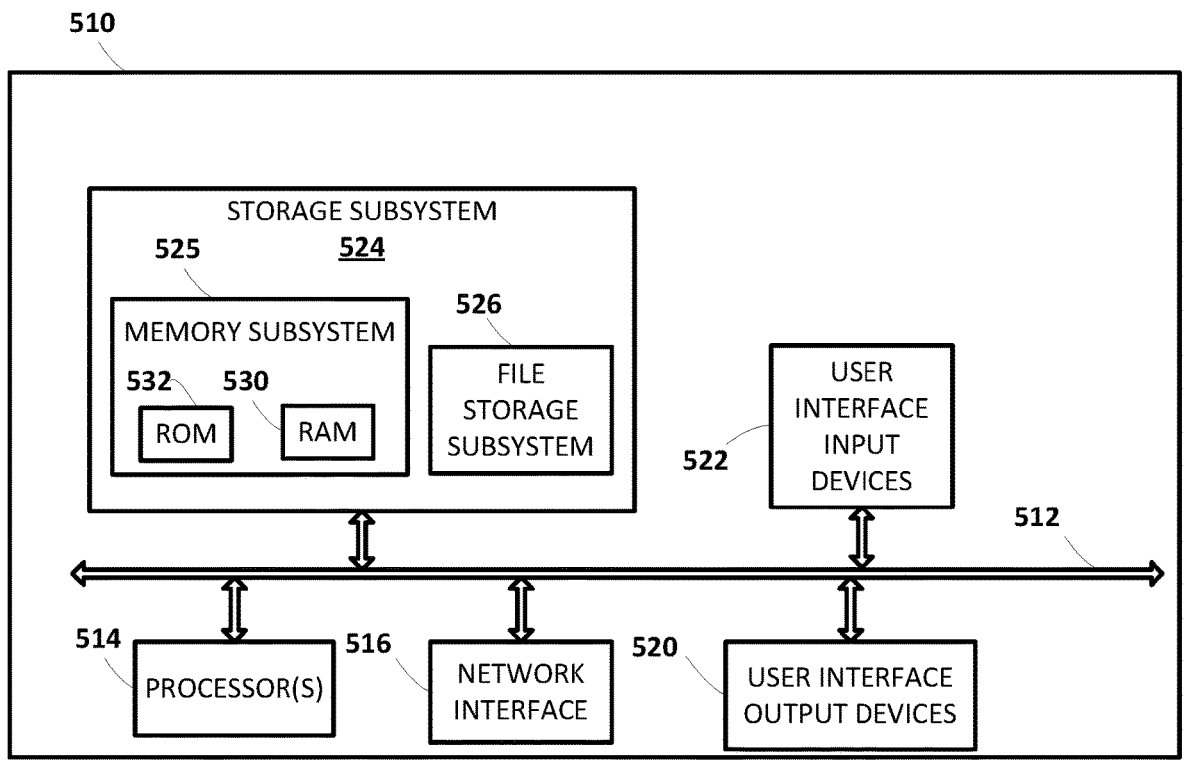
FIG. 5 illustrates an example architecture of a computing device.

FIG. 5 is a block diagram of an example computing device 510 that may optionally be utilized to perform one or more aspects of techniques described herein. In some implementations, one or more of the client computing devices 160$_{1-N}$, automated assistant 120, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the method of FIG. 4.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   determining at least one candidate query based on one or more already communicated messages of an ongoing message exchange thread,
      the ongoing message exchange thread being between at least a first user and a second user via a first message exchange client of the first user and a second message exchange client of the second user;
   providing, for display along with, but not included in, a display of a transcript of the ongoing message exchange thread, a selectable graphical element that provides an indication of the at least one candidate query, wherein the indication of the at least one candidate query includes one or more terms of the at least one candidate query, and wherein the selectable graphical element is provided for display to at least the first user via the first message exchange client; and
   in response to receiving user interface input of the first user that is directed to the selectable graphical element when the selectable graphical element is displayed along with the transcript of the ongoing message exchange thread:
      automatically incorporating content that is responsive to one or more of the terms of the at least one candidate query into the transcript of the ongoing message exchange thread,
         wherein incorporating the content into the transcript of the ongoing message exchange thread comprises incorporating the content into the transcript of the ongoing message exchange thread with a graphical indication that the content is generated by an automated assistant,
         wherein incorporating the content into the transcript of the ongoing message exchange thread causes the content to be displayed to the first user via the first message exchange client and to be displayed to the second user via the second message exchange client,
         wherein incorporating the content into the transcript of the ongoing message exchange thread causes the content to be maintained in the transcript of the ongoing message exchange thread after an additional message is communicated, by the first user or the second user, and after the additional message is incorporated in the transcript of the ongoing message exchange thread, and
         wherein the content is selectable to launch an application in a state that is tailored to the content;
      determining an additional related query based on the content that is responsive to one or more of the terms of the at least one candidate query and that is automatically incorporated into the message exchange thread;
      providing, for display along with, but not included in, the display of the transcript, an additional selectable graphical element that provides an indication of the additional related query,
         wherein the additional selectable graphical element is provided for display without simultaneous display of the graphical element; and
      in response to receiving additional user interface input of the first user that is directed to the additional selectable graphical element when the additional selectable graphical element is displayed along with the transcript of the ongoing message exchange thread:

automatically incorporating additional content that is responsive to the additional related query into the ongoing message exchange thread.

2. The method of claim 1, wherein automatically incorporating the content into the ongoing message exchange thread comprises requesting that at least one of the message exchange clients insert the content into the transcript of the ongoing message exchange thread that is displayed in a graphical user interface of the at least one of the message exchange clients.

3. The method of claim 2, wherein the content includes one or more of text and an image.

4. The method of claim 1, wherein determining the at least one candidate query comprises:
selecting the at least one candidate query from a corpus of queries based on conformance between one or more query terms of the at least one candidate query and one or more message terms of the already communicated messages of the ongoing message exchange thread.

5. The method of claim 1, wherein determining the at least one candidate query comprises:
determining at least one entity referenced in the already communicated messages of the ongoing message exchange thread; and
determining the at least one candidate query based on the at least one entity.

6. The method of claim 5, wherein determining the at least one candidate query based on the at least one entity comprises:
generating one or more query terms for the at least one candidate query based on an alias of the at least one entity.

7. The method of claim 1, wherein determining the at least one candidate query and providing the selectable graphical element occur independent of formulation by the user of any additional natural language input for inclusion in the message exchange thread.

8. The method of claim 1, further comprising:
determining a score for the at least one candidate query based on one or more terms of at least one of the already communicated messages of the ongoing message exchange thread;
wherein providing the selectable graphical element is based on the score satisfying a threshold.

9. The method of claim 8, wherein determining the score based on the one or more terms of at least one of the already communicated messages comprises at least one of:
determining the score based on whether a named entity is included in the terms; and
determining the score based on whether a plurality of the terms conform to at least one predefined search query pattern.

10. The method of claim 1, further comprising:
determining a score for the at least one candidate query based on at least one of:
a popularity measure for the at least one candidate query that is based on a quantity of submissions of the candidate query, and
a quality measure for the content that is responsive to the at least one candidate query;
wherein providing the selectable graphical element is based on the score satisfying a threshold.

11. The method of claim 1, further comprising:
submitting the at least one candidate query to a search engine;
receiving one or more search results in response to submitting the at least one candidate query to the search engine; and
determining the content to incorporate into the ongoing message exchange thread based on at least one of the search results.

12. The method of claim 11, wherein submitting the at least one candidate query to the search engine is in response to receiving the user interface input that is directed to the selectable graphical element.

13. The method of claim 1, further comprising:
providing, for display to the first user via the first message exchange client, an additional selectable graphical element that identifies a textual reply and, that when selected, causes the textual reply to be incorporated into the ongoing message exchange thread as a reply by the first user to a most recently communicated message of the already communicated messages, causes the textual reply to be incorporated into the ongoing message exchange thread with an indication that the textual reply originated from the first user, and causes the textual reply to be incorporated into the ongoing message exchange thread without incorporating any content that is responsive to the textual reply.

14. The method of claim 1, wherein providing the selectable graphical element further comprises:
providing the selectable graphical element for display to the second user via the second message exchange client, wherein providing the selectable graphical element for display to the second user via the second message exchange client occurs before receiving the user interface input of the first user that is directed to the selectable graphical element.

15. The method of claim 1, wherein the content automatically incorporated into the ongoing message exchange thread includes a selectable first content item focused on a first entity and a selectable second content item focused on a second entity;
wherein user interface input directed at the first content item causes additional first entity content focused on the first entity to be incorporated into the message exchange thread; and
wherein user interface input directed at the second content item causes additional second entity content focused on the second entity to be incorporated into the message exchange thread.

16. The method of claim 1, wherein the content includes a first image or text focused on a first entity and further includes at least one selectable deep link that, when selected, cause one or more additional computing actions to be performed that are specific to the first entity.

17. The method of claim 1,
wherein incorporating the additional content into the transcript of the ongoing message exchange thread comprises incorporating the additional content into the transcript of the ongoing message exchange thread with an additional graphical indication that the additional content is generated by the automated assistant,
wherein incorporating the additional content into the transcript of the ongoing message exchange thread causes the additional content to be displayed to the first user via the first message exchange client and to be displayed to the second user via the second message exchange client, and
wherein incorporating the additional content into the transcript of the ongoing message exchange thread causes the additional content to be maintained in the transcript of the ongoing message exchange thread after a further additional message is communicated, by the first user or the second user, and after the further additional message is incorporated in the transcript of the ongoing message exchange thread.

18. A system comprising memory and one or more processors, the memory storing instructions that, when executed by the one or more processors, cause the one or more processors to:
determine a particular candidate query based on at least a first already communicated message of an ongoing message exchange thread and a second already communicated message of the ongoing message exchange thread,
the ongoing message exchange thread being between at least a first user and a second user via a first message exchange client of the first user and a second message exchange client of the second user,
the particular candidate query including one or more first terms of the first already communicated message and one or more second terms of the second already communicated message;
provide, for display along with, but not included in, a display of a transcript of the ongoing message exchange thread, a selectable graphical element that provides an indication of the particular candidate query, wherein the indication of the particular candidate query includes one or more terms of the particular candidate query, and wherein the selectable graphical element is provided for display to at least the first user via the first message exchange client and the second user via the second message exchange client; and
in response to receiving user interface input, of either the first user or the second user, that is directed to the selectable graphical element when the selectable graphical element is displayed along with the display of the transcript of the ongoing message exchange thread:
automatically incorporate content that is responsive to one or more of the terms of the particular candidate query into the transcript of the ongoing message exchange thread,
wherein incorporating the content into the transcript of the ongoing message exchange thread comprises incorporating the content into the transcript of the ongoing message exchange thread with a graphical indication that the content is generated by an automated assistant,
wherein in incorporating the content into the transcript of the ongoing message exchange thread the one or more processors are to cause the content to be displayed to the first user via the first message exchange client and to be displayed to the second user via the second message exchange client,
wherein in incorporating the content into the transcript of the ongoing message exchange thread the one or more processors are to cause the content to be maintained in the transcript of the ongoing message exchange thread after an additional message is communicated, by the first user or the second user, and incorporated in the transcript of the ongoing message exchange thread, and
wherein the content is selectable to launch an application in a state that is tailored to the content;
determine an additional related query based on the content that is responsive to one or more of the terms of the at least one candidate query and that is automatically incorporated into the message exchange thread;
provide, for display along with, but not included in, the display of the transcript, an additional selectable graphical element that provides an indication of the additional related query,
wherein the additional selectable graphical element is provided for display without simultaneous display of the graphical element; and
in response to receiving additional user interface input of the first user that is directed to the additional selectable graphical element when the additional selectable graphical element is displayed along with the transcript of the ongoing message exchange thread:
automatically incorporate additional content that is responsive to the additional related query into the ongoing message exchange thread.

19. At least one non-transitory computer-readable medium comprising instructions that, in response to execution of the instructions by one or more processors, cause the one or more processors to perform the following operations:
determine at least one candidate query based on one or more already communicated messages of an ongoing message exchange thread,
the ongoing message exchange thread being between at least a first user and a second user via a first message exchange client of the first user and a second message exchange client of the second user;
provide, for display along with, but not included in, a display of a transcript of the ongoing message exchange thread, a selectable graphical element that provides an indication of the at least one candidate query, wherein the indication of the at least one candidate query includes one or more terms of the at least one candidate query, and wherein the selectable graphical element is provided for display to at least the first user via the first message exchange client;
in response to receiving user interface input of the first user that is directed to the selectable graphical element when the selectable graphical element is displayed along with the display of the transcript of the ongoing message exchange thread:
automatically incorporate content that is responsive to one or more terms of the at least one candidate query into the transcript of the ongoing message exchange thread,
wherein incorporating the content that is responsive to one or more of the terms of the at least one candidate query into the transcript of the ongoing message exchange thread comprises incorporating the content into the transcript of the ongoing message exchange thread with a graphical indication that the content is generated by an automated assistant,
wherein in incorporating the content that is responsive to one or more of the terms of the at least one candidate query into the transcript of the ongoing message exchange thread the one or more processors are to cause the content to be displayed to the first user via the first message exchange client and to be displayed to the second user via the second message exchange client,
wherein in incorporating the content that is responsive to one or more of the terms of the at least one candidate query into the transcript of the ongoing message exchange thread the one or more processors are to cause the content to be maintained in the transcript of the ongoing message exchange thread after an additional message is communicated, by the first user or the second user, and incorporated in the transcript of the ongoing message exchange thread, and
    wherein the content is selectable to launch an application in a state that is tailored to the content;
determine an additional related query based on the content that is responsive to one or more of the terms of the at least one candidate query and that is automatically incorporated into the message exchange thread;
provide, for display along with, but not included in, the display of the transcript, an additional selectable graphical element that provides an indication of the additional related query,
    wherein the additional selectable graphical element is provided for display without simultaneous display of the graphical element; and
in response to receiving additional user interface input of the first user that is directed to the additional selectable graphical element when the additional selectable graphical element is displayed along with the transcript of the ongoing message exchange thread:
    automatically incorporate additional content that is responsive to the additional related query into the ongoing message exchange thread.

* * * * *